United States Patent [19]

Bessmer et al.

[11] 4,293,597
[45] Oct. 6, 1981

[54] METHOD OF FORMING A ROOFING COMPOSITE USING SILICONE RUBBER COMPOSITION

[75] Inventors: Stanley J. Bessmer, Cohoes; Warren R. Lampe, Ballston Lake, both of N.Y.

[73] Assignee: General Electric Company, Waterford, N.Y.

[21] Appl. No.: 80,143

[22] Filed: Sep. 28, 1979

Related U.S. Application Data

[60] Continuation of Ser. No. 537,085, Dec. 30, 1974, abandoned, which is a division of Ser. No. 478,824, Jun. 12, 1974, Pat. No. 3,888,815, which is a continuation of Ser. No. 389,733, Aug. 20, 1973, abandoned, which is a continuation of Ser. No. 180,068, Sep. 13, 1971, abandoned.

[51] Int. Cl.³ .................... B05D 7/14; B05D 3/00
[52] U.S. Cl. .................... 427/186; 427/204; 427/372.2; 427/387
[58] Field of Search .............. 427/186, 204, 372.2; 260/375 B; 528/15, 18, 30, 34, 38, 39

[56] References Cited

U.S. PATENT DOCUMENTS

| | | |
|---|---|---|
| 2,902,389 | 9/1959 | Keil . |
| 2,946,701 | 7/1960 | Plueddemann . |
| 3,088,847 | 5/1963 | Pines . |
| 3,127,363 | 3/1964 | Nitzsche et al. . |
| 3,170,894 | 2/1965 | Brown et al. . |
| 3,247,281 | 4/1966 | Gagliardi . |
| 3,280,072 | 10/1966 | Frankland . |
| 3,364,161 | 1/1968 | Nadler . |
| 3,418,162 | 12/1968 | Adachi . |
| 3,436,251 | 4/1969 | Rees . |
| 3,449,289 | 6/1969 | Schank et al. . |
| 3,477,901 | 11/1969 | Keil . |
| 3,524,900 | 8/1970 | Gibbon et al. ............ 260/46.5 G X |
| 3,551,376 | 12/1970 | Seufried et al. . |
| 3,560,442 | 2/1971 | Golitz et al. . |
| 3,575,917 | 4/1971 | Kapral . |
| 3,609,178 | 9/1971 | Thomas . |
| 3,619,256 | 11/1971 | Pepe et al. . |
| 3,621,047 | 11/1971 | Golitz et al. . |
| 3,635,887 | 1/1972 | Polmanteer . |
| 3,671,484 | 6/1972 | Cooper et al. . |
| 3,678,033 | 7/1972 | Kaiser et al. .................. 260/46.5 G |
| 3,686,357 | 8/1972 | Cheeseman . |
| 3,772,237 | 11/1973 | Ballman . |

FOREIGN PATENT DOCUMENTS

| | | | |
|---|---|---|---|
| 124650 | 5/1972 | Norway | 427/186 |
| 216837 | 11/1967 | Sweden | 427/186 |
| 975604 | 11/1964 | United Kingdom . | |

*Primary Examiner*—Shrive P. Beck
*Attorney, Agent, or Firm*—Morgan, Finnegan, Pine, Foley & Lee

[57] ABSTRACT

A process of forming a roofing composite comprising applying to a roofing substrate a self-bonding room temperature vulcanizable silicone rubber composition comprising a linear organopolysiloxane, a filler, an alkyl silicate or a hydrolyzate product of an alkyl silicate and a nitrogen functional silane of the formula,

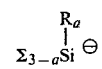

where R is selected from the class consisting of monovalent hydrocarbon radicals and halogenated monovalent hydrocarbon radicals, $\Sigma$ is a hydrolyzable group selected from the class consisting of alkoxy, phenoxy, halo, aminodialkylamino, and tertiary hydroperoxy and $\theta$ is a saturated, unsaturated or aromatic hydrocarbon residue functionalized by a member selected from the class consisting of amino, carbonyl, carboxy, isocyano, azo, diazo, thio, thia, dithia, isothiocyano, oxo, oxa, halo, ester, nitroso, sulfhydryl, hydrocarbonylamido, sulfonamido and multiples and combinations thereof and wherein a is a whole number that varies from 0 to 2. There may also be included in the above composition a metallic salt of an organo monocarboxylic or dicarboxylic acid.

8 Claims, No Drawings

METHOD OF FORMING A ROOFING COMPOSITE USING SILICONE RUBBER COMPOSITION

This application is a continuation of patent application Ser. No. 537,085 filed Dec. 30, 1974, now abandoned which is a division of patent application Ser. No. 478,824, filed June 12, 1974, now U.S. Pat. No. 3,888,815, which in turn is a continuation of patent application Ser. No. 389,733, filed Aug. 20, 1973, now abandoned which in turn is a continuation of application Ser. No. 180,068, filed Sept. 13, 1971 which is now abandoned.

BACKGROUND OF THE INVENTION

The present invention relates to room temperature vulcanizable silicone rubber compositions and in particular the present invention relates to self-bonding two-package room temperature vulcanizable silicone rubber compositions.

Room temperature vulcanizable silicone rubber compositions are well known. Such silicone rubber compositions are divided in two types, the one-package room temperature vulcanizable silicone rubber composition and the two-package room temperature vulcanizable silicone rubber compositions.

The one-package room temperature vulcanizable silicone rubber compositions comprise compositions in which all the ingredients as well as the catalyst systems are mixed together and the resulting composition is stored in anhydrous state. As long as moisture does not come into contact with the composition, it does not cure. However, once the composition is applied to any surface or in some other application and thus comes into contact with moisture in the air or other types of moisture, it rapidly cures to a hard elastomeric state.

The two-package room temperature vulcanizable silicone rubber compositions are basically manufactured in two components, one being the base polymer and the other being the catalyst system. Each component is stored separately until it is desired to form the hard elastomeric rubber type of product. When it is desired to cure this system then the base polymer and the catalyst system are brought together and mixed, whereupon the resulting composition cures to the hard elastomeric state. Such a two-package room temperature vulcanizable silicone rubber composition is described, for instance, in Berridge U.S. Pat. No. 2,843,555.

Such two-package room temperature vulcanizable silicone rubber compositions have as ingredients a hydroxy-terminated diorganopolysiloxane mixed with an appropriate filler. This mixture forms the base polymer composition. The other part of the two-package system comprises an alkyl silicate or partially hydrolyzed alkyl silicate into which is added a curing catalyst selected from certain metallic salts of organic carboxylic acids such as lead or tin octoate. Such a composition has the main advantage that when the two components are mixed together, that is, the base polymer and the catalyst component, the composition can be molded and cured in place at room temperature. Such compositions have many advantages for forming various types of molded products and even for forming roof coatings as well as other applications. Such a system is less expensive then one-package room temperature vulcanizable silicone rubber compositions, as well as being in certain applications easier to work with. However, such a two-package system as described in the Berridge patent and further as described and developed up to the present time results in a cured silicone rubber composition which does not form a strong adhesive bond between the silicone rubber composition and the substrate to which it is applied. It can be appreciated that for such an application as a roof coating, it would be highly desirable to form a two-package room temperature vulcanizable silicone rubber composition which would form as strong a bond as possible between the silicone rubber layer and the substrate. It is most preferred that the bond be so strong between the silicone rubber layer and the substrate that upon the application of pressure or tension upon the rubber layer that there will be cohesive failure rather than adhesive failure.

The name cohesive failure is given to the case when upon the application of pressure to rubber or other material bonded to a substrate, the rubber ruptures or fails rather than the bond between the rubber and the substrate. The designation adhesive failure is given to the case when upon the application of pressure or tension to a rubber substrate laminate, the bond between the silicone rubber and the substrate fails or gives way before the rupturing of either the rubber layer or the substrate layer.

To obtain such a bond between two-package room temperature vulcanizable silicone rubber compositions and various substrates, there has come into use various primers. Such primers are applied on the substrate, allowed to dry and then the two-package silicone system is applied thereover and cured. One common example of such a primer system for two-package silicone rubber compositions comprises a silicone resin and an alkoxy silane dissolved in a mixture of various solvents. However, even with such a primer system there is not always obtained a sufficiently strong bond between the silicone rubber composition and the substrate. In fact, even with the use of a primer system as mentioned above, in many cases when such laminates are tested and tension is applied to the cured silicone rubber composition there is obtained adhesive failure rather than cohesive failure.

In addition, such primer systems and in particular the bond formed with such primer systems is hydrolytically unstable, i.e., the presence of water and particularly a great deal of water degrades the bond and the cohesive action of the primer system in bonding and joining the silicone rubber layer to the substrate. In the case where the two-package silicone rubber composition is to be applied as a roof coating, it can be seen that this hydrolytic instability is a great disadvantage. Such hydrolytic instability is the case with almost all known primer systems for two-package room temperature vulcanizable silicone rubber compositions. This hydrolytic instability which results in a rupturing or weakening of the bond between the silicone rubber composition and the substrate is also true with other types of silicone rubber compositions whether or not a primer is used. Thus, common types of one-package room temperature vulcanizable silicone rubber compositions which are applied to a substrate will normally not adhere or bond as strongly as desired to the substrate in the continual presence of moisture or water.

In the case of two-package room temperature vulcanizable silicone rubber compositions which are bonded to various substrates with or without the use of a primer, this hydrolytic instability is even more marked.

In the case where the silicone rubber composition is used as a coating in the construction of buildings and particularly as a roof coating, it can be appreciated that it is of paramount importance that the silicone rubber composition be bonded to the roof substrate so as to form a bond which is not hydrolytically unstable. As can be appreciated, roofs are constantly exposed to excessive moisture such as rain water, snow, ice and sleet and if the bond between the substrate and the silicone rubber composition is hydrolytically unstable then the bond will shortly rupture.

It is one object of the present invention to provide for a novel self-bonding room temperature vulcanizable silicone rubber composition.

It is another object of the present invention to provide a process for producing a novel self-bonding room temperature vulcanizable silicone rubber composition.

It is still another object of the present invention to provide a novel self-bonding room temperature vulcanizable silicone rubber composition which will form superior bonds with various metals, masonry and wood substrates.

It is an additional object of the present invention to provide a novel room temperature vulcanizable silicone rubber composition which forms bonds with various substrates whether of metal, plastic, masonry or wood wherein the bond formed with such substrates is hydrolytically stable.

These and other objects of the present invention are accomplished by means of the silicone rubber composition defined below.

SUMMARY OF THE INVENTION

In accordance with the present invention, there is provided a self-bonding room temperature vulcanizable silicone rubber composition comprising (a) a linear fluid organopolysiloxane containing terminal silicon-bonded hydroxy groups and having a viscosity of 500 to 10,000,000 centipoise when measured at 25° C., the organic groups of the aforesaid organopolysiloxane represent monovalent hydrocarbon radicals, (b) a filler, (c) from 0 to 15 weight percent of an alkyl silicate selected from the class consisting of (1) a monomeric organosilicate corresponding to the general formula, $$(R^{40}O)_3Si-R^{41} \qquad (1)$$

where $R^{40}$ is a radical selected from the class consisting of monovalent hydrocarbon radicals and halogenated monovalent hydrocarbon radicals, and $R^{41}$ is selected from the class consisting of alkyl, haloalkyl, aryl, haloaryl, alkenyl, cycloalkyl, cycloalkenyl, cyanoalkyl, alkoxy and acyloxy radicals, and (2) a liquid partial hydrolysis product of the aforementioned organosilicate monomeric compounds, and (d) a nitrogen functional silane of the formula, $$\Sigma_{(3-a)}\text{Si}\theta \qquad (2)$$

where R is selected from the class consisting of monovalent hydrocarbon radicals and halogenated monovalent hydrocarbon radicals, 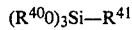 is a hydrolyzable group selected from the class consisting of alkoxy, phenoxy, halo, amino, dialkylamino and tertiary hydropropoxy and θ is a saturated, unsaturated or aromatic hydrocarbon residue functionalized by a member selected from the class consisting of amino, carbonyl, carboxy, isocyano, azo, diazo, thio, thia, dithia, isothiocyano, oxo, oxa, halo, ester, nitroso, sulfhydryl, halocarbonyl, amido, sulfonamido and multiples and combinations thereof, and a is a whole number that varies from 0 to 2.

The alkyl silicate may be present in amounts of from 0 to 15.0% by weight of the organopolysiloxane. The filler in the composition may be present in the amounts of 5% to 300% by weight of filler based on the weight of the organopolysiloxane. The nitrogen functional silane is present at a concentration of at least 0.1 to as much as 10% by weight of the linear organopolysiloxane having terminal silanol groups thereon in order to impart the desired self-bonding properties to the room temperature vulcanizable silicone composition. The nitrogen functional silane of formula (2) acts both as a self-bonding agent as well as a catalytic agent in the composition. If it is desired that the composition cure at a fast rate there may be used in addition to the nitrogen functional silane other types of catalytic agents. For instance, there may be used from 0 to 5% by weight of the linear organopolysiloxane of a catalyst which is a metallic salt of an organic monocarboxylic or dicarboxylic acid in which the metal ion is selected from the class consisting of lead, tin, zirconium, antimony, iron, cadmium, barium, calcium, titanium, bismuth and manganese. In addition, nitrogen functional silanes within the scope of those compounds indicated for formula (2) are those having the formula,

 (3)

where $R^1$ is selected from the class consisting of monovalent hydrocarbon radicals and halogenated monovalent hydrocarbon radicals of up to 10 carbon atoms, and preferably $R^1$ is selected from alkyl radicals of 1 to 5 carbon atoms. In addition, it is preferred that although the a may vary from 0 to 2, that the a have a value of 0.

The filler that may be used in the present composition is highly reinforcing filler and semi-reinforcing filler selected from the class consisting of titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crushed quartz, calcined clay, asbestos, carbon, graphite, cork, cotton and synthetic fibers. The preferred filler for the present application is, of course, fumed silica and precipitated silica and particularly fumed silica or precipitated silica that has been treated with various types of siloxane compositions.

In addition to the above compounds in the present composition, there may be utilized a branched or straight polymer compound of $(R^{42})_2SiO$ units, $(R^{42})_3SiO_{\frac{1}{2}}$ units and $R^{42}SiO_{3/2}$ units where there are present 0.1 to 8 percent by weight of hydroxy radicals and the viscosity of the polymer is between 500 to $1.0 \times 10^5$ centipoise at 25° C. The ratio of the organosiloxy units to the diorganosiloxy units is from 0.11 to 1.4 and the ratio of the triorganosiloxy units to the diorganosiloxy units is from 0.02 to about 1, inclusive.

DESCRIPTION OF THE PREFERRED EMBODIMENT

The preferred linear fluid organopolysiloxane containing terminal silicon-bonded hydroxy groups and having a viscosity of 500 to 10,000,000 centipoises when measured at 25° C., has preferably the formula,

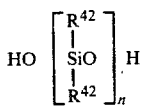

(4)

where $R^{42}$ is selected from monovalent hydrocarbon radicals and halogenated monovalent hydrocarbon radicals and r is a whole number that varies from 250 to 7,275. The radicals R, $R^1$, and $R^{42}$ are preferably selected from the class consisting of alkyl radicals such as methyl, ethyl, propyl, butyl, hexyl, etc.; aryl radicals, such as phenyl, diphenyl, methyl and etc.; alkenyl radicals such as tolyl, xylyl, ethylphenyl and etc.; aralkyl radicals such as benzyl, phenyl, ethyl, and etc.; haloaryl and haloalkyl such as chlorophenyl, tetrachlorophenyl, difluorophenyl and etc.; and alkenyl radicals such as vinyl, allyl, etc. Further, $R^{42}$ may also represent cyanoalkyl, cycloalkyl and cycloalkenyl radicals. The $R^{42}$ groups attached to a single silicon radical may be the same groups or different groups. It has been found that at least 50% and preferably 70 to 100% of the $R^{42}$ groups in the diorganopolysiloxane molecule should be methyl. Further, the diorganopolysiloxane can be a homopolymer or a copolymer such as, for example, it has different types of units in the chain such as dimethyl, diphenyl, methyl-phenyl, etc.

The organopolysiloxanes of formula (4) may also be represented by the average unit formula,

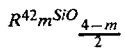

(5)

where $R^{42}$ is defined above and the value of m may vary from 1.99 to 2. The average unit formula includes organopolysiloxanes having terminal groups other than hydroxy such as monofunctional and trifunctional terminal groups. However, in the present case, it is preferred that the terminal groups be hydroxy and the monofunctional and trifunctional groups be kept to a minimum.

Preparation of the diorganopolysiloxanes of formulas (4) and (5) may be carried out by any of the procedures well known to those skilled in the art. Such polysiloxanes can be produced by following a procedure involving hydrolysis of one or more hydrocarbon substituted dichlorosilanes in which the substituents consist of saturated or unsaturated hydrocarbon groups to produce a crude hydrolyzate containing a mixture of linear and cyclic polysiloxanes. The crude hydrolyzate is then treated with a suitable catalyst such as KOH so that it can be depolymerized to form a mixture of low boiling, low molecular weight cyclic polymers and undesirable materials such as the monofunctional trifunctional chlorosilane starting material. The resulting composition is fractionally distilled and there is obtained a pure product containing the low boiling, low molecular weight cyclic polymers free of any significant amount of monofunctional and trifunctional groups.

In order to depolymerize the crude hydrolyzate, there is added to said hydrolyzate, KOH and a diphenyl solvent and the mixture is heated at a temperature in the range of 150° C. to 175° C. under an absolute pressure of 100 mm of Hg. to produce and remove by evaporation a product consisting of low molecular weight cyclic polysiloxanes comprising, for example, about 85 percent of the tetramer and 15 percent of the mixed trimer and pentamer. Among the cyclic polymers that may so be produced are hexamethylcyclotrisiloxane, octamethylcyclotetrasiloxane and dimethylcyclopentasiloxane. There also may be formed mixtures of cyclopolysiloxanes such as a mixture of octamethylcyclotetrasiloxane and ethylmethylcyclotetrasiloxane, and mixtures of cyclic polymers of dimethylsiloxane with cyclic polymers of diphenylsiloxane, cyclicmethylphenylsiloxanes and cyclicmethylvinylsiloxanes.

The pure cyclic polysiloxanes are mixed in the desired proportions to obtain the above defined mixture. Then the mixture of the cyclic polysiloxanes are subjected to an equilibration procedure to obtain the diorganopolysiloxane of formula (4). The equilibration is preferably carried out at temperatures of about 125° C. to 150° C. in the presence of a small amount of rearrangement catalyst such as potassium hydroxide, tetrabutyl phosphonium hydroxide, etc. The amount of catalyst used will depend on the extent of the polymerization desired. Generally, 5–10 ppm (parts per million) of the catalyst is sufficient for the polymerization to produce diorganopolysiloxane polymers of a viscosity of $5.0 \times 10^5$ to $1.0 \times 10^7$ centipoise measured at 25° C. There is also present in the reaction mixture 15–150 ppm (parts per million) of water based on the cyclic polymer so as to supply the hydroxy groups which function as chainstoppers for the linear diorganopolysiloxane material that is formed. After the equilibration reaction has proceeded for two hours there is reached an equilibration point wherein the mixture contains about 85% linear polymers and the amount of linear polymers being formed from the cyclic polymers is equal to the cyclic polymers being formed from the linear polymers.

When this equilibration point has been reached there is added to the mixture a sufficient amount of an acid donor that will neutralize the KOH catalyst so as to terminate the polymerization reaction. Preferably, 1.7 parts per million of tris-(2-chloroethylphosphite) are added to the reaction mixture to liberate HCl which reacts with and neutralizes the KOH and so terminates the equilibration reaction. The cyclicdiorganosiloxanes is the reaction mixture are then distilled off to leave the polydiorganosiloxane gum which is useful in the present invention. The resulting linear diorganopolysiloxanes are chain-stopped primarily with hydroxy groups and have a viscosity of $5 \times 10^5$ to $1.0 \times 10^7$ centipoise at 25° C. Further, the number of diorgano substituent groups in the siloxane chain is at least 2,150.

High molecular weight diorganopolysiloxanes having a viscosity of $5 \times 10^5$ centipoise at 25° C. and above can be treated with water to arrive at low molecular weight diorganopolysiloxanes having a viscosity of 500 to $5 \times 10^5$ centipoise at 25° C. This may be accomplished by blowing steam across the surface of the high molecular weight product or through the polymer for a sufficient length of time to obtain the low molecular weight component having the desired silanol content. Thus, it is desirable to obtain the low molecular weight diorganopolysiloxane of formula (3) from a portion of the high molecular weight diorganopolysiloxanes by the above water treatment well known to those skilled in the art so as to reduce the number of diorganosiloxy units from above 7,275 to a value of 250 to 2,150. The use of steam in this fashion will cause a decrease in the viscosity of the polymer while at the same time the formed linear polysiloxane will have terminal silicon-bonded hydroxy groups.

Alternatively, the low molecular weight diorganopolysiloxanes can be produced from the high molecular weight diorganopolysiloxane by adding water to them and heating the resulting composition at elevated temperatures of 150° C. to 170° C. so as to break up the long chain polymers into smaller chains. The amount of water used will vary depending upon such factors as the molecular weight of the polymers being treated, the time and the temperature at which the mixture of high molecular weight diorganopolysiloxanes are heated and the desired viscosity. These conditions may readily be determined, for example, a high molecular weight diorganopolysiloxane having a viscosity of 2,000,000 centipoise at 25° C. may be heated to 150° C. with 0.5 percent by weight of water for two hours to arrive at a low molecular weight organopolysiloxane of formula (3) having a viscosity of 2,000 centipoise. Preferably, the low molecular weight organopolysiloxane is produced so that it has a viscosity of 2,000 to 3,000 centipoise at 25° C.

In order for the diorganopolysiloxane fluids to cure there must be present in the composition the cross-linking agent of formula (1). In that formula, $R^{40}$ groups may be alkyl radicals such as methyl, ethyl, propyl, isopropyl, butyl, amyl, isoamyl, octyl, isooctyl, decyl, dedecyl; haloalkyl such as the chlorinated, brominated, fluorinated alkyl radicals. In addition, $R^{40}$ may represent aryl, aralkyl and alkenyl radicals such as vinyl, allyl, phenyl, tolyl, xylyl, benzyl, phenylethyl, naphthyl, anthracyl, biphenyl, as well as the halogen-substituted derivatives of the above radicals. In addition, $R^{40}$ may represent cycloalkenyl, cycloalkyl and cyanoalkyl radicals. The radical $R^{41}$ represents the same radicals as $R^{40}$ and, in addition, preferably represents alkoxy and aryloxy radicals such as methoxy, ethoxy, butoxy and phenoxy.

In addition to the monomeric organosilicates of formula (1), there is also preferably used as a cross-linking agent, liquid partially hydrolyzed products of the monomeric silicates. Such hydrolysis products are obtained by effecting partial hydrolysis in water of the particular monomeric organosilicate in the presence of small amounts of acid to a point where it is still water-insoluble and still possible to isolate a liquid partially hydrolyzed organosilicon compound. Thus, the ethyl silicate having the formula $(C_2H_5O)_4Si$ may be partially hydrolyzed by adding acids or acid-forming metal salts to the liquid monomeric organosilicate such as $FeCl_3$, $CuCl_2$, $AlCl_3$, $SnCl_4$ and thereafter effecting suitable hydrolysis of this mixture of ingredients in water to obtain the two-phase composition from which the water-insoluble, partially hydrolyzed organosilicate can readily be separated from the aqueous phase and catalyst. The partially hydrolyzed ethyl silicate is sold under the tradename Ethyl Silicate-40, by Union Carbide Corporation.

Generally, there is added from 0 to 15.0% by weight of the cross-linking agent of formula (1) and preferably 0.1 to 10% by weight based on the weight of the diorganopolysiloxane of formulas (4) and (5). If more than 15.0% by weight of cross-linking agent is used, the excess does not function as a cross-linking agent since the initial hydroxy positions on the organopolysiloxane are already reacted with the cross-linking agent and the excess acts as a filler which reduces the elasticity of the cured silicone rubber composition. If less than 0.1% by weight of cross-linking agent is used, there is not sufficient cross-linking agent to react with the organopolysiloxane to form the cured silicone rubber.

Although the preferable cross-linking agents are organosilicates, there may also be used as cross-linking agents organopolysiloxane resins having a functionality greater than 2 and preferably greater than 2.5. The organopolysiloxane resins are methylsiloxanes, or resins which contain both monomethyl and dimethyl or monophenyl units. There may also be used ethylsiloxane resins in which the ratio R"Si is 1.4 to 1 and which mixture contains 15% of butoxy groups or there may be used resins in which the ratio R"Si is 1.1 to 1 and which contain 10% of methoxy groups or there may be used methylphenylsiloxane resins containing 50% of monomethyl units, 25% of dimethyl units and 25% of monophenyl units.

Other suitable cross-linking agents are organohydrogenpolysiloxanes of the formula,

  (6)

in which $R^{43}$ is an alkyl or aryl radical and a is a number less than 2, but is not zero. The organohydrogenpolysiloxane cross-linking agents have the disadvantage that during curing there is evolved hydrogen gas which can result in bubbles being trapped in the silicone rubber composition. Although the above cross-linking agents can be used in the compositions, the organosilicates of formula (1) are preferred since the processability of the composition is facilitated and the cured silicone rubber composition has better physical properties. A more detailed description of these other cross-linking agents is to be found in Nitzsche et al, U.S. Pat. No. 3,127,363.

There is incorporated into the organopolysiloxane fluid of formulas (4) and (5), a filler which may be of the reinforcing filler type or of the semi-reinforcing type. Generally, the reinforcing fillers have 100-300 square meter surface areas per gram while the semi-reinforcing fillers have a surface area of 1-20 square meters per gram.

The reinforcing fillers are added when it is desired to have a high strength silicone rubber composition, that is, a composition with high values for tensile strength and percent elongation. Illustrative of the many fillers which can be employed are titanium dioxide, lithopone, zinc oxide, zirconium silicate, silica aerogel, iron oxide, diatomaceous earth, calcium carbonate, fumed silica, precipitated silica, glass fibers, magnesium oxide, chromium oxide, zirconium oxide, aluminum oxide, crushed quartz, calcined clay, asbestos, carbon, graphite, cork, cotton and synthetic fibers. There can also be used silica filler treated with an organo cyclic trimer or tetramer such that the filler is hydrophobic. Generally, there can be added to said diorganopolysiloxane of formulas (4) and/or (5), 5 to 300% by weight of filler and preferably 10-200% by weight.

The other desirable component in this silicone rubber composition is a catalyst. It has been found that only certain metallic salts of organic carboxylic acids and dicarboxylic acids, in addition to the nitrogen functional silanes of formula (2), may be employed with the organopolysiloxanes of formula (4) and (5) as a curing catalyst. Suitable acid radicals are the recinate, linoleate, stearate, oleate, as well as the lower radicals such as acetate, butyrate, octoate and others which form the necessary metallic salts. Preferably, metallic salts of lauric acid have been found to be especially effective. The metal ion of the metal salt is one selected from the class consisting of lead, tin, zirconium, antimony, iron, cadmium, barium, calcium, titanium, bismuth and manganese. Thus, examples of suitable metallic salt catalysts are tin naphthenate, lead octoate, tin octoate, iron stearate, tin oleate, antimony octoate, tin butyrate, basic dibutyl tin laurate and dibutyl tin dilaurate. The tin and lead salts are preferred since they are usually soluble in the diorganopolysiloxanes of formulas (4) and (5) and since they have enhanced catalytic activity in combination with the alkyl silicate. It is important to note that other compounds which would be expected to exercise good catalytic activity in the mixture of diorganopolysiloxane, filler and alkyl silicate exercised no catalytic activity whatsoever. This class of compounds are zinc salts of organic acids, cobalt oleate, cobalt naphthenate, manganese naphthenate, nickel naphthenate and calcium stearate. Generally, 0.1 to 5% by weight of the metallic salt is used based on the weight of the diorganopolysiloxane.

One specific nitrogen functional silane coming within the scope of formula (3) above is compounds having the formula,

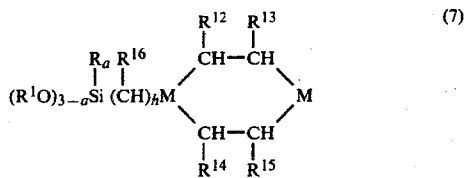  (7)

wherein R and $R^1$ are selected from the class consisting of monovalent hydrocarbon radicals and halogenated monovalent hydrocarbon radicals and preferably may be selected from the various types of radicals disclosed above for the $R^{42}$ radical. Preferably, R and $R^1$ are selected from alkyl and aryl radicals of 10 carbon atoms or less and preferably have 1 to 5 carbon atoms. The radicals $R^{12}$, $R^{13}$, $R^{14}$, $R^{15}$ and $R^{16}$ in formula (7) above are selected from the class consisting of hydrogen, alkyl radicals and aryl radicals of up to 10 carbon atoms, M is selected from the class consisting of $SO_2$ and $C=O$, h is a whole number that varies from 3 to 20 and as pointed out previously a is a whole number that varies from 0 to 2. For further information as to this compound as well as to the method of synthesis of this compound, the reader is referred to the U.S. Pat. No. 3,801,572. The disclosure of this patent is hereby incorporated into the present case by reference.

Compounds falling within the scope of formula (7) above which are preferred in the present invention for particularly being suited to providing desirable bonding properties for the resulting composition are as follows:

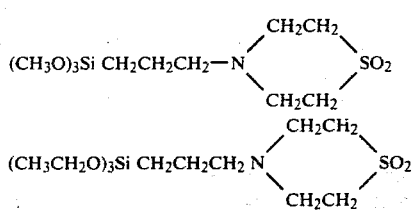

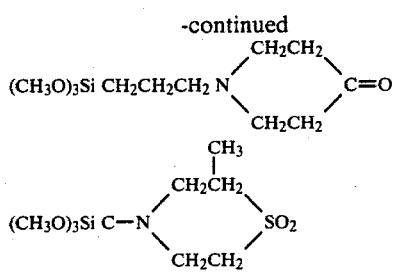

Another class of compounds coming within the scope of formula (3) above have the formula,

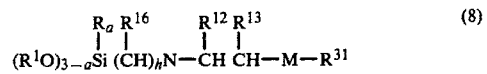  (8)

where R and $R^1$ are as previously defined, $R^{31}$ is selected from the class consisting of monovalent hydrocarbon radicals and halogenated monovalent hydrocarbon radicals, $R^{16}$, $R^{12}$ and $R^{13}$ are selected from the class consisting of hydrogen, alkyl radicals and aryl radicals of up to 10 carbon atoms, M is as previously defined, h is a whole number that varies from 3 to 20 and a is a whole number that varies from 0 to 2. Again, for the synthesis of this compound of formula (8) above as well as further details, one is referred to the above U.S. Pat. No. 3,001,572, whose disclosure is hereby incorporated into this application by reference.

Compounds coming within the scope of formula (8) and which are preferred in the present application are as follows:

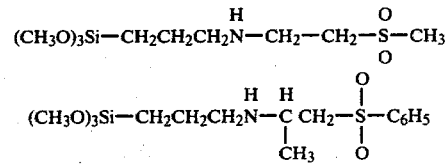

Another group of nitrogen functional silanes coming within the scope of formula (3) above have the general formula,

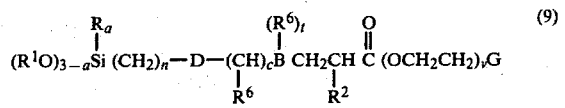  (9)

where R and $R^1$ are as previously defined, $R^2$ and $R^6$ are selected from the class consisting of hydrogen, alkyl and aryl radicals of up to 10 carbon atoms, B is selected from the class consisting of nitrogen, sulfur and oxygen, G is selected from the class consisting of

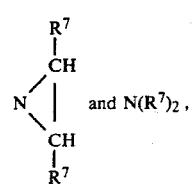 and $N(R^7)_2$, where $R^7$ is selected from the class consisting of hydrogen, alkyl radicals and aryl radicals of up to 10 carbon atoms, c and n are whole numbers that vary from 1 to 10, D is selected from the class consisting of

and oxygen, t is a whole number that varies from 0 to 1, v is a whole number that varies from 1 to 5 and a is a whole number that varies from 0 to 2, as previously stated.

Preferable compounds in the present case which come within the scope of formula (9) above are as follows:

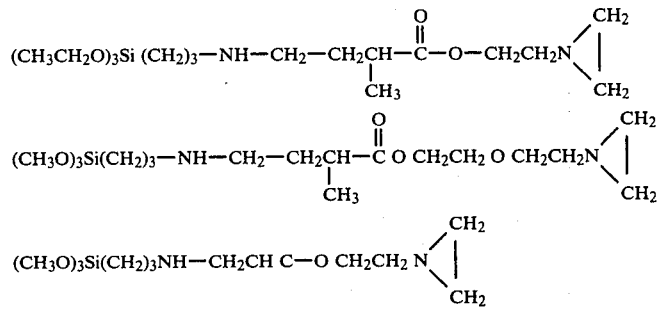

For further information as to the scope of the compounds within formula (9) above, the reader is referred to the application of Tyrene D. Mitchell, Ser. No. 169,481 filed Aug. 5, 1971. The disclosure of this application is hereby incorporated into the present specification by reference.

Another group of compounds, i.e., nitrogen functional silanes coming within the scope of formula (3) above are of the formula,

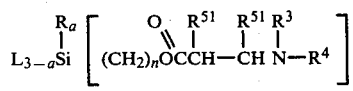

where L is selected from the group consisting of $R^1_2N$—, and $R^1O$—, R and $R^1$ are as previously defined, $R^{51}$ is selected from the class consisting of alkyl and aryl radicals of up to 10 carbon atoms, $R^3$ and $R^4$ are independently selected from the class consisting of hydrogen, aryl radicals, alkyl radicals

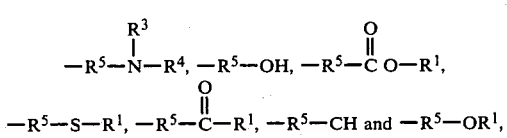

where $R^5$ is a divalent hydrocarbon radical selected from the class consisting of alkylene and arylene radicals of up to 10 carbon atoms, n is a whole number that varies from 1 to 20 and a is a whole number that varies from 0 to 2.

Compounds coming within the scope of formula (10) which are preferred in the present composition are as follows:

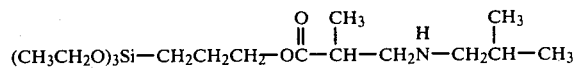

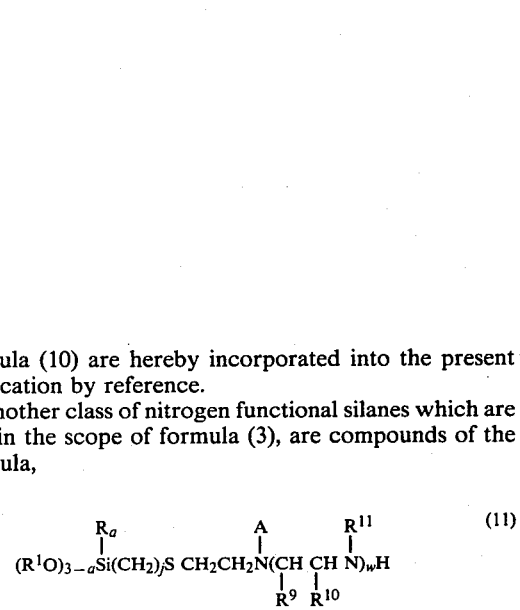

For more information as to the compounds of formula (10) above one is referred to U.S. Pat. No. 3,700,716. The disclosure of this patent for purposes of disclosing the methods and ways of obtaining the compounds of formula (10) are hereby incorporated into the present application by reference.

Another class of nitrogen functional silanes which are within the scope of formula (3), are compounds of the formula,

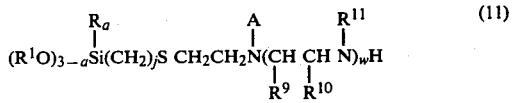

where R and $R^1$ are as previously defined, $R^9$, $R^{10}$ and $R^{11}$ are selected from the class consisting of hydrogen, alkyl radicals and aryl radicals of up to 10 carbon atoms, j is a whole number that varies from 2 to 20, w is a whole number that varies from 1 to 500, A is selected from the class consisting of hydrogen, alkyl radicals, aryl radicals and

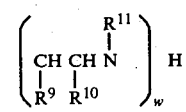

and a is a whole number that varies from 0 to 2, as previously disclosed.

Compounds which are preferred in the present application and which come within the scope of formula (11) above, are as follows:

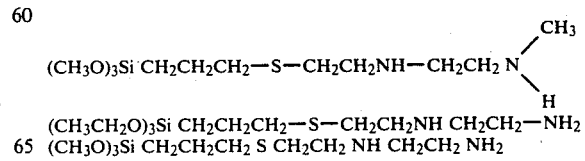

The compounds of formula (11) before are more fully disclosed and discussed in U.S. Pat. No. 3,700,715. The disclosure of this patent is hereby incorporated into the present application by reference.

Another nitrogen functional silane coming within the scope of formula (3) above is the nitrogen functional silane of the formula,

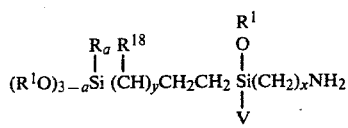     (12)

where R and $R^1$ are as previously defined, $R^{18}$ is selected from the class consisting of hydrogen, alkyl radicals and aryl radicals, V is selected from the class consisting of R and $R^1O-$, y is a whole number that varies from 0 to 20, x is a whole number that varies from 2 to 20, and a varies from 0 to 2, as previously stated.

Preferable compounds in the present composition which come within the scope of formula (12) above, are as follows:

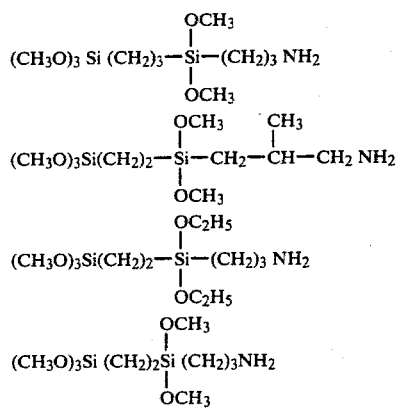

The composition disclosed in formula (12) above is more fully described and disclosed in the U.S. Pat. No. 3,729,496. The disclosure of this application is hereby incorporated into the present specification by reference and all references for further particulars as to the composition of formula (12) above should be to that disclosure.

Another class of nitrogen functional silanes coming within the scope of formula (3) above, are those of the formula,

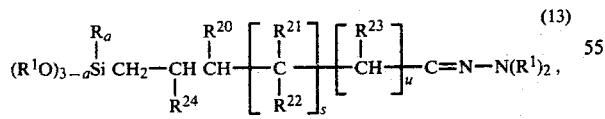     (13)

where R and $R^1$ are as previously defined, $R^{20}$, $R^{21}$, $R^{22}$, $R^{23}$ and $R^{24}$ are independently selected from the class consisting of hydrogen, alkyl radicals, cycloalkyl radicals and aryl radicals of up to 10 carbon atoms, s is a whole number that varies from 0 to 1, u is a whole number that varies from 0 to 20, and a is a whole number that varies from 0 to 2.

The preferred compounds coming within the scope of formula (13) above are as follows:

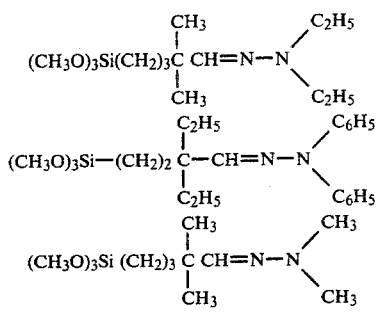

For further information as to the compounds of formula (13) above, as well as to the synthesis and methods and ways of preparing the compounds of formula (13) above, the reader is referred to the disclosure of U.S. Pat. No. 3,700,711. The disclosure of this patent is hereby incorporated into the present specification by reference.

Another class of nitrogen functional silanes coming within the scope of formula (3) above are of the formula,

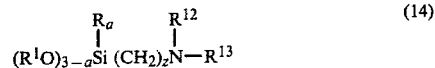     (14)

where R and $R^1$ are as previously defined, $R^{12}$ and $R^{13}$ are independently selected from hydrogen, alkyl radicals and aryl radicals of up to 10 carbon atoms, z is a whole number that varies from 2 to 20 and a is a whole number that varies from 0 to 2.

The compounds of formula (14) above may be prepared by the usual methods of synthesis that are applied to synthesize such compounds. Compounds that are preferred within the scope of formula (14) above are as follows:

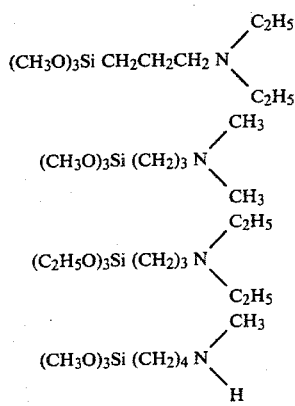

Another group of nitrogen functional silanes coming within the scope of formula (3) above are the nitrogen functional silanes of the formula,

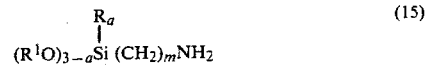     (15)

where R and $R^1$ are as defined previously, m is a whole number that varies from 2 to 20 and a is a whole number that varies from 0 to 2.

Such compounds as in formula (15) above are well known in the art as exemplified by the disclosure of U.S. Pat. No. 2,930,809, whose disclosure is hereby incorporated into the present case by reference.

Compounds within the scope of formula (15) which are preferred in the present application are as follows:

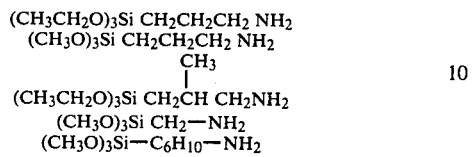

Another class of nitrogen functional silanes coming within the scope of formula (3) above, are nitrogen functional silanes of the formula,

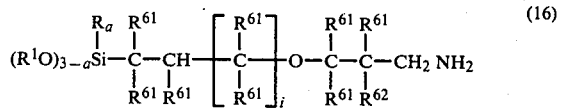

where R and $R^1$ are as previously defined, $R^{61}$ is a radical selected from the class consisting of alkyl radicals, cycloalkyl radicals and where two $R^{61}$ radicals attached to the same carbon atom taken together with the carbon atom to which they are attached may form a cycloalkyl radical having 5 to 7 carbon atoms, $R^{62}$ is a lower ethyl radical such as methyl, ethyl, propyl, i is a whole number that varies from 1 to 4 and a is a whole number that varies from 0 to 2.

Compounds coming within the scope of formula (16) above that are preferred in the self-bonding two-package room temperature vulcanizable composition of the present case are as follows:

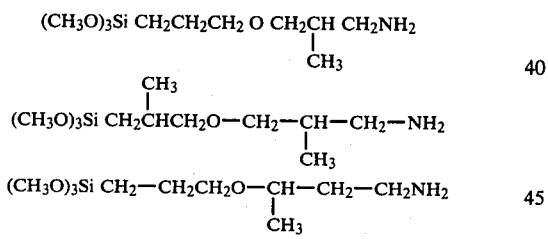

The synthesis of the compounds of formula (16) above as well as more fuller disclosure and description of these compounds which are intended to be disclosed and claimed in the present application is to be found in U.S. Pat. No. 3,598,853, whose disclosure is hereby incorporated into the present application by reference.

An additional class of nitrogen functional silanes coming within the scope of the nitrogen functional silanes of formula (3) above are the nitrogen functional silanes of the formula,

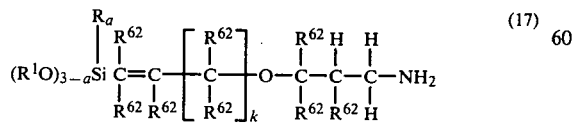

where R and $R^1$ are as defined previously, $R^{62}$ is independently selected from the class consisting of hydrogen, lower alkyl radicals, cycloalkyl radicals containing up to 7 carbon atoms, mononuclear and binuclear aryl radicals, mononuclear aryl lower alkyl radicals and further radicals whose two $R^{62}$ radicals attached to the same carbon atom, taken together with the carbon atoms to which they are attached form a cycloalkyl radical, k is a whole number that varies from 1 to 9 and a is a whole number that varies from 0 to 2.

Preferred compounds coming within the scope of formula (17) above are as follows:

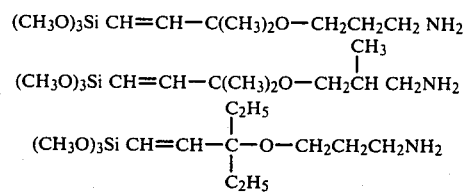

The nitrogen functional silanes coming within the scope of formula (17) above are more fully disclosed and discussed in U.S. Pat. No. 3,549,590. further this patent discloses the synthesis of such compounds within the scope of formula (17) above, and the disclosure of this patent is hereby incorporated into the present application by reference.

The above compounds are preferred in the present composition. However, in the case of the compounds of formula (17), as well as of other compounds coming within the other sub-generic formulas disclosed above, any compound coming within the scope of these formulas can be used as a self-bonding additive that may be added to two-package room temperature vulcanizable silicone rubber compositions disclosed in the present application, both for the purpose of improving self-bonding properties as well as for the purpose of being used by themselves or in addition with other catalytic agents in the function of acting as catalytic agents.

In addition to the above nitrogen functional silanes there is disclosed by the present case, nitrogen functional silanes coming within the scope of formula (3) above which have the formula,

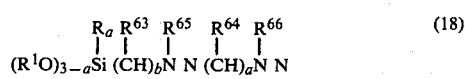

where R and $R^1$ are as defined previously, $R^{63}$, $R^{64}$, $R^{65}$ and $R^{66}$ are independently selected from the class consisting of hydrogen, alkyl radicals and aryl radicals of up to 10 carbon atoms, b is a whole number that varies from 2 to 10, d is a whole number that varies from 2 to 10 and a is a whole number that varies from 0 to 2.

Compounds coming within the scope of formula (18) above which are preferred in the self-bonding two-package room temperature vulcanizable silicone rubber composition of the present invention are as follows:

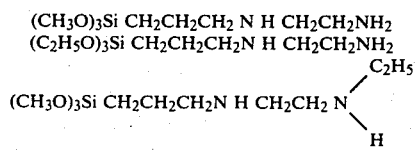

The compounds of formula (18) above are more fully disclosed and described as well as the synthesis for the preparation thereof in U.S. Pat. No. 2,971,864, whose disclosure is hereby incorporated into the present case by reference.

Another sub-generic class of nitrogen functional silanes coming within the scope of formula (3) above are those silanes having the formula,

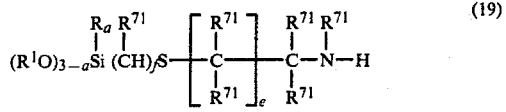 (19)

where R and $R^1$ are as previously defined, $R^{71}$ is independently selected from the class consisting of hydrogen, alkyl radicals, and aryl radicals of up to 10 carbon atoms, e is a whole number that varies from 1 to 10, f is a whole number that varies from 2 to 10, and a is a whole number that varies from 0 to 2, as previously disclosed.

Preferred compounds coming within the scope of formula (19) above are as follows:

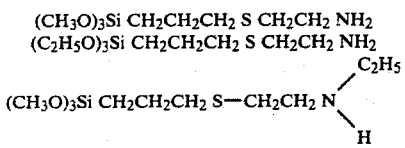

Compounds coming within the scope of formula (19) above which are more preferred in the present application are those disclosed above. However, as previously stated any of the compounds disclosed in the sub-generic formula (19) will function in the present application as self-bonding additives as has been discussed previously. In addition, the compounds of formula (19) above are more fully disclosed and described in U.S. Pat. No. 3,488,373, as well as the synthesis for these compounds being disclosed in this patent, whose disclosure is hereby incorporated into the present specification by reference.

As another example of a sub-generic class of nitrogen functional silanes which come within the scope of formula (3) above and which are preferred in the application of the present case it is intended to describe and claim in the present application the nitrogen functional silanes of the formula,

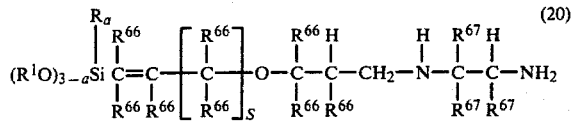 (20)

wherein R and $R^1$ are as previously defined, $R^{66}$ and $R^{67}$ are independently selected from hydrogen, alkyl radicals, aryl radicals, cycloalkyl radicals containing 5 to 7 carbon atoms, mononuclear and binuclear aryl radicals, mononuclear aryl lower alkyl radicals and further radicals where two $R^{66}$ or $R^{67}$ radicals attached to the same carbon atom, taken together with the carbon atom to which they are attached form a cycloalkyl radical and in which the different $R^{66}$ and $R^{67}$ radicals may be all the same or different, s is a whole number that varies from 1 to 4, and a is a whole number that varies from 0 to 2.

Preferred compounds coming within the scope of sub-generic formula (20) above are compounds of the formula,

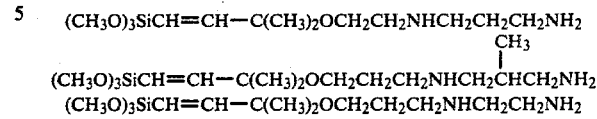

The compounds of formula (20) above are more fully disclosed and discussed as well as the synthesis for the preparation thereof in U.S. Pat. No. 3,549,590, whose disclosure is hereby incorporated into the present application by reference. For further details as to these compounds of formula (20) above, the reader is referred to the above U.S. patent.

In applying the components that are present in the room temperature vulcanizable composition of the present case, the linear diorganopolysiloxane is mixed with filler and color pigments and then stored separately. A second mixture is then composed of the alkyl silicate, with or without a solvent such as xylene and the aminofunctional silane. If the aminofunctional silane is used in high enough concentrations then another type of curing catalyst is not necessary. However, another type of curing catalyst can be used in conjunction with aminofunctional silane. As a result of the above, there are two mixtures formed—one the base polymer which is stored separately and the other the curing catalyst system which is stored separately. When it is desired to produce the cured room temperature vulcanizable composition, the base polymer is mixed with a curing catalyst mixture and the material is spread, rolled, molded or applied in one manner or another to the desired application. It should be noted that as these two components are mixed together there is approximately 10 minutes work time available to mix the two components together and to mold the resulting mixture into the desired surface. Within 20 to 30 minutes after the initial mixture of the components is carried out at ambient temperature the materials have achieved a sufficient degree of cure (Shore A Hardness 15) to be assumed a definite form. After 1 hour, the silicone rubber composition cures to approximately 80% of the final Shore A Hardness. After 6 hours very little additional change of Hardness occurs. Preferably, the mixture of the base polymer and the curing agent composition is allowed to cure for 24 hours in whatever application it is put to so that it develops its full properties as a room temperature vulcanizable silicone composition. The resulting two-package room temperature vulcanizable silicone rubber composition may be used to form various types of silicone rubber materials. Such a composition may also be used to form laminated coatings for various applications such as for coating cloth or for coating roofs.

In the case where the room temperature vulcanizable silicone rubber composition is to be used for coating roofs, then it is desirable to dissolve the base polymer, i.e., the mixture of the linear diorganopolysiloxane, filler and coloring agent in one of the common hydrocarbon solvents available for that purpose, for example, inert hydrocarbon solvents such as benzene, toluene, mineral spirits, cyclohexane and etc. When such a solution is formed of the base polymer in the solvent, it is desirable to form a solution in which the solvent forms 5 to 10% by weight of the solution and the base polymer which comprises the linear diorganopolysiloxane, the filler and the coloring pigment forms from 50 to 95% of the solution. This solution of the base polymer is then mixed with a curing agent catalyst composition as disclosed above and the solution or mixture of the case is then applied or coated on roofs or draperies and other type of objects. It should be noted that the presence of room temperature vulcanizable silicone rubber composition is especially suited for coating roofs and that it adheres very strongly and forms a cohesive bond between the roofing substrate and the silicone rubber composition. In addition, roofing granules can be applied to the top of the present two-package room temperature vulcanizable coating composition and such granules will adhere very strongly to the cured silicone rubber composition of the present case.

As pointed out previously, the aminofunctional silanes of the present case as disclosed by the broad generic formula (3) above may be used by themselves without any other curing catalyst and such aminofunctional silanes will function both as a curing catalyst and also as bonding agents for making the silicone rubber composition selfbonding to various substrates. However, if desired, another curing catalyst may be added to the basic composition as disclosed above.

In the case where the nitrogen functional silane is to be used without any additional curing agent, then it is generally desired to use the nitrogen functional silane at a concentration of 0.1 to 10% by weight of the linear diorganopolysiloxane, and more preferably at the concentration range of 2 to 8% by weight of the diorganopolysiloxane. In the case where an additional curing agent is used in the composition, then the amino functional silane is preferably used at a concentration of 0.1 to 5% and more preferably in a concentration of 0.5 to 4% by weight of the linear diorganopolysiloxane. In practice, it is preferred that one of the curing catalysts mentioned above in the discussion of additional curing catalysts, be used in addition to the amino functional silane.

There may also be present in the composition certain oxygenated solvents which will prolong the work life of the composition without retarding the final cure. The use of such solvents may prolong the work life or the pot life of the composition by at least a factor of 2, but after the silicone rubber composition has been spread out to dry the solvents evaporate quickly allowing the silicone rubber composition to cure rapidly. Oxygenated solvents that may be used are the alcohols, ether solvents, ester solvents, ketone solvents and alcohol ether solvents such as acetone, methanol, isopropanol, butyl ether, ethyl acetate, isoamylketone and methyl cellosolve.

The following examples are given for the purpose of illustrating the invention and are not intended to limit the invention in any way or manner.

EXAMPLE 1

There is prepared a base polymer solution comprising 100 parts of dimethylpolysiloxane oil which is hydroxy stopped and has a viscosity of 5000 centipoise at 25° C., 160 parts of ground silica filler, 2.0 parts of hydrogenated castor oil, 6.4 parts of titanium dioxide color pigments and 1.6 parts of ceramic black. The above components are mixed together. Then 80% of the above composition is mixed with 20% by weight of mineral spirits solvent. The above composition forms the base polymer solution.

The base polymer solution is mixed with the catalytic composition containing the catalyst, the nitrogen functional silane and the ethyl silicate, dissolved in a solvent. The composition of the catalyst mixture is shown in Table 1 below. Further, in Table 1 below there is shown the weight percent of the catalyst composition used per 100 parts by weight of the polymer solution defined above. The resulting composition was cured for the period of time set forth in Table 1 below.

The resulting cured two-package room temperature vulcanizable silicone composition coating was then tested for adhesion and the results are indicated in Table 1 below.

TABLE I

| SELF-BONDING CHARACTERISTICS OF TWO-PACKAGE COMPOSITIONS TO VARIOUS SUBSTRATES | | | | | | | | | |
|---|---|---|---|---|---|---|---|---|---|
| Ingredient | Test No. 1 | 2 | 3 | 4 | 5 | 6 | 7 | 8 | 9 |
| Silane I* | — | 48 | — | — | — | — | — | — | — |
| Silane II** | 40 | — | 20 | — | 30 | 30 | 30 | 30 | — |
| Silane III*** | — | — | — | 20 | — | — | — | — | — |
| Ethyl Silicate-40 | 10 | 12 | 10 | 10 | 10 | 10 | 10 | 10 | 10 |
| Hexabutylditin | 0.12 | 0.14 | — | — | — | — | — | — | — |
| Dibutyl tin dilaurate | — | — | 10 | 10 | 5 | 2 | 0.3 | 0.1 | 3.3 |
| Xylene | 50 | — | — | — | — | — | — | — | 13.3 |
| Mineral Spirits | — | — | 40 | 40 | — | — | — | — | — |
| Wt. % of above mixture per 100 parts of Base Polymer Solution | 2.0 | 2.0 | 2.0 | 2.0 | 1.2 | 1.2 | 1.2 | 1.2 | — |
| Property | | | | | | | | | |
| Cure Time, Min. | 30 | 30 | 5 | 5 | 7 | 7 | 45 | 120 | 60 |
| Tack Free Time, Min. | >3<18 hrs. | 7 hrs. | 15 | 10 | 15 | 70 | 200 | 200 | 200 |
| Final Cure (Quality) | Good | Excellent | Excellent | Excellent | Excellent | Excellent | Excellent | Fair | Excellent |
| Qualitative Adhesion at 24 hours | | | | | | | | | |
| Plywood | Excellent | Excellent | Excellent | Excellent | Excellent | Excellent | Excellent | Excellent | Poor |
| Concrete | — | Good/Exc. | Marginal | — | — | — | — | — | Poor |
| Stainless Steel | — | Good/Exc. | Marginal | — | Marginal | Good | Excellent | Excellent | None |
| Alclad Aluminum | Excellent | Good/Exc. | Marginal | Marginal | Excellent | Excellent | Excellent | Excellent | " |
| Bare Aluminum | — | — | Marginal | — | Poor | Excellent | Excellent | Excellent | " |
| Carbon Steel | Excellent | — | Marginal | — | Good | Excellent | Excellent | Excellent | " |
| Adhesion-Hydrolytic Stability at 1 mo., 120° F. 95+% Humidity | | | | | | | | | |
| Plywood | Excellent | Excellent | Excellent | Excellent | Excellent | Excellent | Excellent | Excellent | None |
| Concrete | — | Good/Exc. | Marginal | — | — | — | — | — | " |

TABLE I-continued

| SELF-BONDING CHARACTERISTICS OF TWO-PACKAGE COMPOSITIONS TO VARIOUS SUBSTRATES | | | | | | | | | |
|---|---|---|---|---|---|---|---|---|---|
| Ingredient | Test No. 1 | 2 | 3 | 4 | 5 | 6 | 7 | 8 | 9 |
| Stainless Steel | — | Good/Exc. | Marginal | — | Marginal | Good | Excellent | Excellent | " |
| Alclad Aluminum | Excellent | Good/Exc. | Marginal | Marginal | Excellent | Excellent | Excellent | Excellent | " |
| Bare Aluminum | — | — | Marginal | — | Poor | Excellent | Excellent | Excellent | " |
| Carbon Steel | Excellent | — | Marginal | — | Good | Excellent | Excellent | Excellent | " |

*Silane I - $(CH_3O)_3Si\ CH=CH-C(CH_3)_2O-CH_2CH_2CH_2NH_2$

**Silane II - $(CH_3O)_3Si\ CH_2CH_2CH_2O-CH_2CH\ CH_2NH_2$
$\qquad\qquad\qquad\qquad\qquad\qquad\qquad |$
$\qquad\qquad\qquad\qquad\qquad\qquad\quad CH_3$

***Silane III - $(CH_3CH_2O)_3Si-CH_2-CH_2-CH_2-NH_2$

In addition, the compositions indicated in Table I above, after they are coated on a particular substrate the resulting laminated product is taken and placed in a humidity chamber which was partly filled with water so that the laminated product is partly immersed in water. This humidity chamber is kept at 120° F. at 95+% relative humidity. After one month in this atmosphere the laminated product is taken out and again tested for adhesion. These results are also indicated in Table I above.

The above results indicate the excellent self-bonding characteristics of the compositions of the present case, as well as the fact that the bonds that are formed between the silicone rubber composition and the substrate are hydrolytically stable in a far more superior manner than is possible with silicone rubber compositions previously devised. It may also be pointed out that the silicone rubber composition of the present case is self-bonding with superior adhesion to all types of substrates—masonry, plastic, metal and wood, including plywood, phenolic, concrete, stainless steel, alclad aluminum, bare aluminum, carbon steel, copper, tin and other types of such substrates.

EXAMPLE 2

A base polymer solution is formed in accordance with the procedure of Example 1, using the concentrations as well as the ingredients indicated in Example 1. There is then formed a curing catalyst mixture in accordance with the ingredients and concentrations shown in Table II below.

The curing catalyst compositions are mixed with the base polymer solutions in the concentrations indicated in Table II below. The resulting room temperature vulcanizable coating composition is then applied to various substrates and its curing properties are noted as indicated in Table II below.

As shown below in Table II, the room temperature vulcanizable coating compositions were applied to various substrates such as Alclad aluminum, plywood, base aluminum and stainless steel. The resulting laminates were then placed in a humidity chamber which was maintained at 120° F., and 95+% relative humidity. The humidity chamber was partly filled with water so that the panels that were placed into the humidity chamber were partly immersed in water. The resulting laminated substrates were kept in the humidity chamber under the conditions specified above for 2 months. After the 2-month period, the panels were taken out of the humidity chamber and tested for quality of adhesion as shown below.

TABLE II

| SELF-BONDING CHARACTERISTICS OF TWO-PACKAGE COMPOSITIONS TO VARIOUS SUBSTRATES AND USE OF OXYGENATED SOLVENTS TO EXTEND POT LIFE | | | | | | | | | |
|---|---|---|---|---|---|---|---|---|---|
| Ingredient | Test No. 1 | 2 | 3 | 4 | 5 | 6 | 7 | 8 | 9*** |
| Silane I* | — | — | — | — | — | — | 30 | — | — |
| Silane II** | 30 | 30 | 30 | 30 | 30 | 30 | — | 30 | — |
| Ethyl Silicate-40 | 10 | 10 | 10 | 10 | 10 | 10 | 10 | 10 | 10 |
| Dibutyl tin dilaurate | 0.5 | 0.5 | 0.5 | 0.5 | 0.5 | — | — | — | 3.3 |
| Dibutyl tin diacetate | — | — | — | — | — | 0.2 | 0.2 | 0.2 | — |
| Methylisoamyl ketone | — | — | — | — | 40 | — | — | — | — |
| Methyl Cellosolve | — | — | — | — | — | 40 | 40 | — | — |
| Ethyl acetate | — | — | 40 | — | — | — | — | — | — |
| Isopropanol | — | 40 | — | — | — | — | — | — | — |
| t-butanol | — | — | — | 40 | — | — | — | — | — |
| Xylene | — | — | — | — | — | — | — | — | 13.3 |
| Wt.% of above mixture per 100 parts of Base Polymer Solution | 2.4 | 2.4 | 2.4 | 2.4 | 2.4 | 4.0 | 4.0 | 2.4 | 2.0 |
| Curing Properties | | | | | | | | | |
| Pot Life (min.) | 40 | 60–90 | 60–70 | 60 | 120 | 90–180 | 25 | 17 | 60 |
| Tack Free Time (hrs.) | 3–4 | >2<18 | >2<18 | 2–3 | 3–4 | 3–4 | 2–3 | 2–3 | |
| Final Cure | Good | Good | Good | Good | Good | Good | Fair/Good | Good | |
| Qualitative Adhesion at 24 hours | | | | | | | | | |
| Alclad Aluminum | Excellent | Excellent | Excellent | Excellent | Excellent | — | — | — | Excellent |
| Plywood | Excellent | Excellent | Excellent | Excellent | Excellent | — | — | — | — |
| Aluminum (Bare) | Excellent | — | — | — | — | Excellent | Good | Excellent | Good |
| Stainless Steel (304) | Excellent | — | — | — | — | Excellent | Good | Excellent | Excellent |
| Adhesion-Hydrolytic Stability at 2 mos., 120° F., 95+% Humidity | | | | | | | | | |
| Alclad Aluminum | Excellent | Excellent | Excellent | Excellent | Excellent | — | — | — | Poor |
| Plywood | Excellent | Excellent | Excellent | Excellent | Excellent | — | — | — | — |

TABLE II-continued

SELF-BONDING CHARACTERISTICS OF TWO-PACKAGE COMPOSITIONS TO VARIOUS SUBSTRATES AND USE OF OXYGENATED SOLVENTS TO EXTEND POT LIFE

| Ingredient | Test No. 1 | 2 | 3 | 4 | 5 | 6 | 7 | 8 | 9*** |
|---|---|---|---|---|---|---|---|---|---|
| Aluminum (Bare) | Excellent | — | — | — | — | Excellent | Poor | Excellent | Very Poor |
| Stainless Steel (304) | Excellent | — | — | — | — | Excellent | Good | Excellent | Very Poor |

*Silane I - $(CH_3CH_2O)_3Si\ CH_2CH_2CH_2-NH_2$

**Silane II - $(CH_3O)_3Si\ CH_2CH_2CH_2-O-CH_2-CH(CH_3)-CH_2-NH_2$

***Metal substrate primed with silicone resin based primer.

The results are indicated in Table II above, which shows that the present room temperature vulcanizable silicone rubber composition is highly efficient in the self-bonding capabilities to various substrates as well as its hydrolytic stability in the presence of excessive amounts of moisture and water over prolonged periods of time. The use of oxygenated solvents such as methyl cellosolve, ethyl acetate and butyl ether retards the cure of the composition as illustrated in the results listed in Table II.

EXAMPLE 3

There is prepared a base polymer solution in accordance with the procedure set forth in Example 1 using the ingredients and concentrations specified in Example 1. A number of these base polymers are formed and to each base polymer solution there is added a catalyst mixture defined in Table III below. The resulting mixture is then applied to one of the various substrates set forth in Table III, and the adhesion is determined after 24 hours cure. The results are given in Table III below.

TABLE III

SELF-BONDING CHARACTERISTICS OF TWO-PACKAGE COMPOSITIONS TO VARIOUS SUBSTRATES

| | Test No. | | | | | | | | | | |
|---|---|---|---|---|---|---|---|---|---|---|---|
| | 1 | 2 | 3 | 4 | 5 | 6 | 7 | 8 | 9 | 10 | 11 |
| Ingredient | | | | | | | | | | | |
| Silane I | 10 | | | | | | | | | | |
| Silane II | | 30 | | | | | | | | | |
| Silane III | | | 10 | | | | | | | | |
| Silane IV | | | | 10 | | | | | | | |
| Silane V | | | | | 30 | | | | | | |
| Silane VI | | | | | | 40 | | | | | |
| Silane VII | | | | | | | 30 | | | | |
| Silane VIII | | | | | | | | 30 | | | |
| Silane IX | | | | | | | | | 30 | | |
| Silane X | | | | | | | | | | 30 | |
| Silane XI | | | | | | | | | | | 10 |
| Hexabutylditin | — | — | — | — | — | 0.17 | — | — | — | — | — |
| Dibutyl tin dilaurate | — | 0.5 | 0.5 | — | 0.5 | — | 0.5 | — | 0.5 | 1.0 | — |
| Ethyl Silicate | 40 | 10 | 10 | 10 | 10 | 10 | 10 | 10 | 10 | 10 | 10 |
| Wt % of above mixture per 100 parts of Base Polymer Solution | 1.0 | 2.4 | 2.4 | 0.75 | 2.4 | 2.0 | 1.2 | 1.2 | 2.4 | 2.4 | 0.75 |
| Final Cure | Good | Good | Good | Good | Good | Good | Good | Good | Good | Good | Good |
| Qualitative Adhesion at 24 hours | | | | | | | | | | | |
| Alclad Aluminum | Exc. | Exc. | — | Exc. | Exc. | Good-Exc. | — | Good | Exc. | Exc. | Exc. |
| Plywood | Exc. | Exc. | Exc. | Exc. | Exc. | Good-Exc. | Good | — | Exc. | Exc. | Exc. |

TABLE III-continued
SELF-BONDING CHARACTERISTICS OF TWO-PACKAGE COMPOSITIONS TO VARIOUS SUBSTRATES

| | Test No. | | | | | | | | | | |
|---|---|---|---|---|---|---|---|---|---|---|---|
| | 1 | 2 | 3 | 4 | 5 | 6 | 7 | 8 | 9 | 10 | 11 |
| Stainless Steel (304) | Exc. | — | — | — | — | Exc. | — | — | — | — | — |

Exc - Excellent

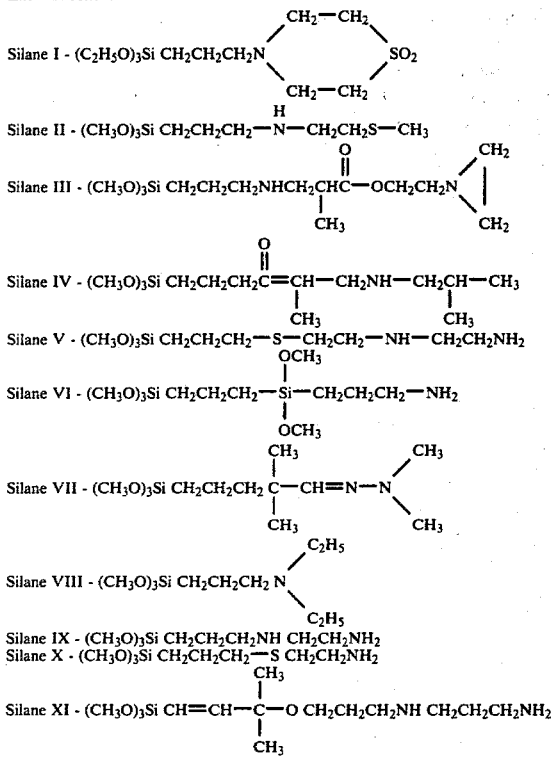

Silane I - $(C_2H_5O)_3Si\ CH_2CH_2CH_2N\begin{array}{c}CH_2-CH_2\\ \\ CH_2-CH_2\end{array}SO_2$ Silane II - $(CH_3O)_3Si\ CH_2CH_2CH_2-\underset{H}{N}-CH_2CH_2S-CH_3$ Silane III - $(CH_3O)_3Si\ CH_2CH_2CH_2NHCH_2\underset{CH_3}{\overset{O}{\overset{\|}{C}H}}C-OCH_2CH_2N\begin{array}{c}CH_2\\ \\ CH_2\end{array}$ Silane IV - $(CH_3O)_3Si\ CH_2CH_2CH_2\overset{O}{\overset{\|}{C}}=CH-CH_2NH-CH_2CH-CH_3$ with $CH_3$, $CH_3$ Silane V - $(CH_3O)_3Si\ CH_2CH_2CH_2-S-CH_2CH_2-NH-CH_2CH_2NH_2$ Silane VI - $(CH_3O)_3Si\ CH_2CH_2CH_2-\underset{OCH_3}{\overset{OCH_3}{Si}}-CH_2CH_2CH_2-NH_2$ Silane VII - $(CH_3O)_3Si\ CH_2CH_2CH_2\ \underset{CH_3}{\overset{CH_3}{C}}-CH=N-N\begin{array}{c}CH_3\\ \\ CH_3\end{array}$ Silane VIII - $(CH_3O)_3Si\ CH_2CH_2CH_2\ N\begin{array}{c}C_2H_5\\ \\ C_2H_5\end{array}$ Silane IX - $(CH_3O)_3Si\ CH_2CH_2CH_2NH\ CH_2CH_2NH_2$
Silane X - $(CH_3O)_3Si\ CH_2CH_2CH_2-S\ CH_2CH_2NH_2$ Silane XI - $(CH_3O)_3Si\ CH=CH-\underset{CH_3}{\overset{CH_3}{C}}-O\ CH_2CH_2CH_2NH\ CH_2CH_2CH_2NH_2$

We claim:

1. A process for forming a composite of a silicone rubber composition and a substrate wherein the bond between said silicone rubber composition and said substrate is hydrolytically stable, said process comprising:

(A) applying to a substrate a self-bonding room temperature vulcanizable silicone rubber composition consisting essentially of (a) a linear, fluid organopolysiloxane containing terminal silicon-bonded hydroxy groups and having a viscosity of 500 to 10,000,000 centipoise when measured at 25° C., the organic groups of the aforesaid organopolysiloxane representing monovalent hydrocarbon radicals; (b) 5 to 300% by weight of said linear organopolysiloxane of a filler; (c) from 0.1–10% by weight based on the linear organopolysiloxane of an alkyl silicate selected from the group consisting of (1) a monomeric organosilicate corresponding to the general formula, $$(R^{40}O)_3Si-R^{41}$$

where $R^{40}$ is a radical selected from the group consisting of monovalent hydrocarbon radicals and halogenated monovalent hydrocarbon radicals and $R^{41}$ is selected from the group consisting of alkyl, haloalkyl, aryl, haloaryl, alkenyl, cycloalkyl, cycloalkenyl, cyanoalkyl, alkoxy and acyloxy radicals, and (2) a liquid partial hydrolysis product of the aforementioned organosilicate monomeric compounds; (d) from 0.1 to 5% by weight of the linear organopolysiloxane of a catalyst which is a metallic salt of an organic monocarboxylic or dicarboxylic acid in which the metal ion is selected from the group consisting of lead, tin, zirconium, antimony, iron, cadmium, barium, calcium, titanium, bismuth and manganese with the exception of manganese napthenate and calcium stearate and (e) an amount in the range of from 0.5 to 4% by weight based on the linear organopolysiloxane, that is sufficient to form a hydrolytically stable bond with a substrate, of a nitrogen-functional silane of the formula, $$\underset{\Sigma_{(3-a)}Si\theta}{\overset{R_a}{|}}$$

where R is selected from the group consisting of monovalent hydrocarbon radicals and halogenated monovalent hydrocarbon radicals, $\Sigma$ is a hydrolyzable group selected from the group consisting of alkoxy, phenoxy, amino and dialkylamino and $\theta$ is a nitrogen-functional radical which is a saturated, unsaturated or aromatic hydrocarbon residue which in addition to nitrogen-functionality may be functionalized by a radical selected from the group consisting of amino, cyano, thio, oxo, and ester, and multiples and combinations thereof and a is a whole number that varies from 0 to 2, and where there is present 5 to 50% by weight of the total composition of a hydrocarbon solvent and an amount of an oxygenated solvent selected from the group consisting of alcohols, ethers, ketones and esters that will prolong the work life of the composition without retarding the final cure; and (B) permitting said composition to cure.

2. The process of claim 1 wherein said substrate is a roofing substrate and further comprising applying roofing granules over said composition after said composition is applied to said roofing substrate.

3. The process of claim 1 wherein said substrate is a roofing substrate.

4. The process of claim 3 wherein the substrate is metal.

5. The process of claim 1 wherein the substrate is masonry.

6. The process of claim 1 wherein the substrate is wood.

7. The process of claim 1 wherein the substrate is plastic.

8. The process of claim 1 wherein the amount of oxygenated solvent is from 0.5% to 5% by weight of total composition.

* * * * *